(12) United States Patent  
Yanagida et al.

(10) Patent No.: US 11,557,204 B2
(45) Date of Patent: *Jan. 17, 2023

(54) LEADING SYSTEM, LEADING DEVICE, AND CONTROL METHOD OF LEADING SYSTEM

(71) Applicant: TOYOTA JIDOSHA KABUSHIKI KAISHA, Toyota (JP)

(72) Inventors: Tohru Yanagida, Nagoya (JP); Chikage Kubo, Chofu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

This patent is subject to a terminal disclaimer.

(21) Appl. No.: 17/237,663

(22) Filed: Apr. 22, 2021

(65) Prior Publication Data

US 2021/0241620 A1     Aug. 5, 2021

Related U.S. Application Data

(63) Continuation of application No. 16/737,658, filed on Jan. 8, 2020, now Pat. No. 11,017,667, which is a (Continued)

(30) Foreign Application Priority Data

Nov. 28, 2017  (JP) .............................. JP2017-228097

(51) Int. Cl.
*G08G 1/123*  (2006.01)
*H04W 4/024* (2018.01)
(Continued)

(52) U.S. Cl.
CPC ............ *G08G 1/123* (2013.01); *H04W 4/021* (2013.01); *H04W 4/024* (2018.02); *H04W 4/40* (2018.02)

(58) Field of Classification Search
CPC .......... G08G 1/005; G08G 1/205; G08G 1/20; G08G 1/123; G01S 19/51; G01S 5/0284;
(Continued)

(56) References Cited

U.S. PATENT DOCUMENTS 6,407,698 B1    6/2002  Ayed
6,489,921 B1   12/2002  Wilkinson
(Continued)

FOREIGN PATENT DOCUMENTS

JP     2004-175252 A    6/2004
JP     2007-118897 A    5/2007
(Continued)

*Primary Examiner* — Eric Blount
(74) *Attorney, Agent, or Firm* — Oblon, McClelland, Maier & Neustadt, L.L.P.

(57) ABSTRACT

A leading system has an output unit configured to output a predetermined signal to a first area around a vehicle, and a terminal carried by a person. The terminal has a receiving unit configured to receive the predetermined signal when the person enters the first area and a first notification unit configured to automatically perform a first notification to the person when the predetermined signal is received by the receiving unit.

20 Claims, 8 Drawing Sheets

Related U.S. Application Data continuation of application No. 16/190,305, filed on Nov. 14, 2018, now Pat. No. 10,559,204.

(51) Int. Cl.
*H04W 4/021* (2018.01)
*H04W 4/40* (2018.01)

(58) Field of Classification Search
CPC ..... B60R 25/102; G01C 21/00; H04W 4/024; H04W 4/40; H04W 4/021
USPC ......................................................... 340/989
See application file for complete search history.

(56) References Cited

U.S. PATENT DOCUMENTS

| | | | |
|---|---|---|---|
| 6,650,999 B1 | 11/2003 | Brust | |
| 6,791,477 B2 | 9/2004 | Sari | |
| 7,522,999 B2 | 4/2009 | Wence | |
| 8,237,591 B2* | 8/2012 | Holcomb | H04M 3/493 340/5.7 |
| 9,562,769 B2 | 2/2017 | Korn | |
| 10,223,744 B2 | 3/2019 | Brady et al. | |
| 10,559,204 B2 | 2/2020 | Yanagida et al. | |
| 2005/0200521 A1 | 9/2005 | Rodriguez | |
| 2008/0106391 A1 | 5/2008 | Santavicca | |
| 2020/0143678 A1 | 5/2020 | Yanagida et al. | |

FOREIGN PATENT DOCUMENTS

| | | |
|---|---|---|
| JP | 2008-285946 A | 11/2008 |
| JP | 2009-110045 A | 5/2009 |
| JP | 2012-57368 A | 3/2012 |
| JP | 2015-185160 A | 10/2015 |
| JP | 2016-80523 | 5/2016 |
| JP | 2017-27546 | 2/2017 |
| JP | 2017-126284 A | 7/2017 |

* cited by examiner

LEADING SYSTEM, LEADING DEVICE, AND CONTROL METHOD OF LEADING SYSTEM

INCORPORATION BY REFERENCE

The present application is a continuation of U.S. patent application Ser. No. 16/737,658, filed on Jan. 8, 2020, which is a continuation of U.S. patent application Ser. No. 16/190,305, filed on Nov. 14, 2018, now U.S. Pat. No. 10,559,204, which claims the benefit of priority of Japanese Patent Application No. 2017-228097 filed on Nov. 28, 2017. The benefit of priority is claimed to each of the foregoing, and the entire contents of each of the foregoing are incorporated herein by reference.

BACKGROUND

1. Technical Field

The disclosure relates to a leading system, a leading device, and a control method of the leading system capable of finding a target vehicle easily.

2. Description of Related Art

Not only an owner of a vehicle but also various persons (family member or another person) may get in the vehicle. There are a wide variety of vehicles. Therefore, an appearance (vehicle type, color, plate number, or the like) of a target vehicle searched for by a certain person may not be grasped by the person. When the appearance of the target vehicle searched for by the person is not grasped, it is difficult for the person to find the vehicle. Even though the appearance of the target vehicle searched for by the person is grasped, the vehicle may not be easily found. For example, when a plurality of vehicles is crowded, it is difficult for the person to find the target vehicle from the vehicles.

In Japanese Unexamined Patent Application Publication No. 2017-027546 (JP 2017-027546 A), a parking position guidance system configured to guide a user to a parking position of the target vehicle is disclosed. In the parking position guidance system disclosed in JP 2017-027546 A, an on-vehicle device sends the parking position of the vehicle based on global positioning system (GPS) data to a management server. A portable terminal acquires the parking position of the vehicle from the management server and guides the user to the acquired parking position of the vehicle.

SUMMARY

However, since the GPS data is insufficient in terms of accuracy, it is not possible to notify the user of a position of the target vehicle with high accuracy in the parking position guidance system disclosed in JP 2017-027546 A. Even though the position of the target vehicle is notified, when the vehicles are crowded, it is difficult for the user to find the target vehicle from the vehicles.

The disclosure provides a leading system, a leading device, and a control method of the leading system capable of finding a target vehicle more easily.

The disclosure employs a method of automatically performing a notification to a person when a predetermined signal is output to an area around a vehicle and a terminal carried by the person receives the predetermined signal.

A first aspect of the disclosure relates to a leading system including an output unit and a terminal. The output unit is configured to output a predetermined signal to a first area around a vehicle. The terminal is carried by a person. The terminal has a receiving unit configured to receive the predetermined signal when the person enters the first area, and a first notification unit configured to automatically perform a first notification to the person when the predetermined signal is received by the receiving unit.

According to the first aspect of the disclosure, since the person can easily grasp that a target vehicle is close by the first notification, it is possible to easily find the target vehicle even when a plurality of vehicles is crowded.

In the leading system according to the first aspect, the first notification may be a notification relating to a distance between the person and the output unit. Accordingly, it is possible for the person to easily grasp that the person continues to approach the target vehicle by the first notification and thus to find the vehicle more easily.

In the leading system according to the first aspect, the terminal may further have a first acquisition unit configured to acquire predetermined information relating to the output unit, and a detector configured to detect that the predetermined signal is received by the receiving unit based on the predetermined information acquired by the first acquisition unit and a signal received by the receiving unit. Accordingly, it is possible to suppress the first notification (erroneous notification) by reception of a signal different from the predetermined signal from the output unit.

In the leading system according to the first aspect, the terminal may further have a first communication unit configured to be able to communicate in an area around the person. The leading system may further have a second communication unit configured to be able to communicate in a second area narrower than the first area around the vehicle, and a second notification unit configured to automatically perform a second notification to the person when the second communication unit communicates with the first communication unit. Accordingly, since the person can easily grasp that the person further approaches the target vehicle by the second notification, it is possible to find the target vehicle more easily.

In the leading system according to the first aspect, the terminal may further have a second acquisition unit configured to acquire permission information for permitting execution of the second notification. The second notification unit may automatically perform the second notification to the person when the second communication unit communicates with the first communication unit to acquire the permission information. Accordingly, it is possible to suppress the second notification (erroneous notification) due to unintended communication.

In the leading system according to the first aspect, the terminal may further have a third acquisition unit configured to acquire position information relating to a position of the vehicle, and a third notification unit configured to perform a third notification based on the position information acquired by the third acquisition unit to the person. Accordingly, it is possible for the person to easily approach the target vehicle based on the position information and thus to easily receive the first notification.

In the leading system according to the first aspect, the third notification may be a guidance to the position of the vehicle. Accordingly, it is possible for the person to easily approach the target vehicle by simply moving according to the guidance and thus to easily receive the first notification.

In the leading system according to the first aspect, a first person who is the person may head toward the vehicle to move and park the vehicle instead of a second person. The leading system may further have a demand unit configured to demand parking of the vehicle of the first person based on a request from the second person. Accordingly, it is possible for the first person to head toward the target vehicle and to move and park the vehicle solely when there is the request from the second person.

In the leading system according to the first aspect, the output unit may be a beacon provided in the vehicle, and each of the predetermined signal and the predetermined information may include a beacon ID. In the leading system according to the first aspect, the second notification may be a blinking of hazard lamps of the vehicle.

A second aspect of the disclosure relates to a leading device carried by a person. The leading device includes a receiving unit and a notification unit. The receiving unit is configured to receive a predetermined signal output by an output unit to an area when the person enters the area around a vehicle. The notification unit is configured to automatically perform a notification to the person when the predetermined signal is received by the receiving unit.

A third aspect of the disclosure relates to a method of controlling a leading system having an output unit and a terminal carried by a person. The method of controlling the leading system has outputting a predetermined signal to an area around a vehicle by the output unit, receiving the predetermined signal by the terminal when the person enters the area, and automatically performing a notification to the person by the terminal when the terminal receives the predetermined signal.

It is possible to regard the aspect of the disclosure as the leading system, the leading device, and the like having at least some of the configurations or the functions. It is possible to regard the aspect of the disclosure as the leading method, the control method of the leading system, the control method of the leading device, and the like including at least some of the processes. It is possible to regard the aspect of the disclosure as a program causing a computer to execute the method, a computer readable recording medium storing such program in a non-transitory manner, and the like. It is possible to combine each of the configurations and the processes to configure the aspect of the disclosure as long as there is no technical inconsistency.

According to each of the aspects of the disclosure, it is possible to find the target vehicle more easily.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The disclosure relates to a technique capable of easily finding a target vehicle. A smart key system is known as a technique relating to a vehicle. The smart key system is a system capable of locking and unlocking of doors or starting an engine when a unique ID is assigned to a portable apparatus (smart key) that performs wireless communication with the vehicle and the ID obtained by the communication matches an ID registered in advance for the vehicle. As a system based on the smart key system, there is a system that portable terminals such as a mobile phone, a smartphone, a tablet terminal, and a notebook type personal computer can be used instead of the portable apparatus. The embodiments of the disclosure can be preferably used, for example, in the system that the portable terminal can be used instead of the portable apparatus.

When the system that the portable terminal can be used instead of the portable apparatus is used, it is possible to provide various services not experienced before. For example, it is possible to provide a valet parking service that a substitute agent moves and parks the vehicle instead of a requester who requests a valet parking. In the valet parking service of the vehicle, the substitute agent heads toward the vehicle in order to move and park the vehicle instead of the requester. However, the substitute agent may not easily find the target vehicle depending on a situation. For example, when a plurality of vehicles including the target vehicle is crowded as when the target vehicle is involved in congestion, it is not possible for the substitute agent to easily find the target vehicle. Consequently, the embodiments of the disclosure can be preferably used in the valet parking service of the vehicle.

Embodiment 1

Hereinafter, an embodiment 1 of the disclosure will be described with reference to drawings.

System Configuration

Figure 1:
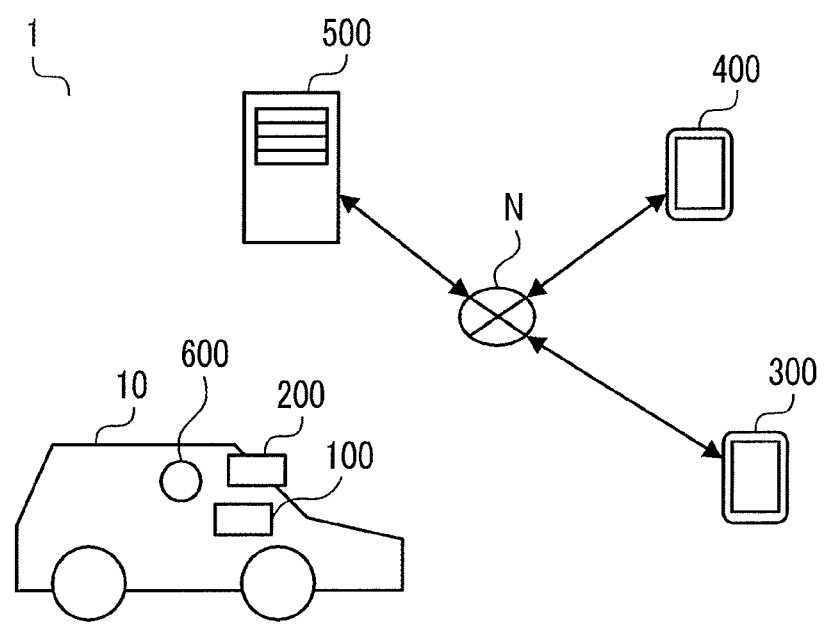
FIG. 1 shows a schematic configuration example of a valet parking system of a vehicle according to an embodiment 1.

A configuration of a valet parking system (leading system configured to lead person to vehicle by notification) of a vehicle according to the embodiment 1 will be described. FIG. 1 shows a schematic configuration example of a valet parking system 1 of the vehicle according to the embodiment 1. The valet parking system 1 of the vehicle is a system to realize the valet parking service of the vehicle described above. The valet parking system 1 of the vehicle has a vehicle control device 100, a key unit 200, a requester terminal 300, a substitute agent terminal 400 (leading device), a server 500, and a beacon 600. The requester terminal 300, the substitute agent terminal 400, and the server 500 are connected to each other in a communicable manner through a network N. Each of the vehicle control device 100, the key unit 200, and the beacon 600 is an on-vehicle device provided in a vehicle 10. Each of the requester terminal 300 and the substitute agent terminal 400 is the portable terminal such as the mobile phone, the smartphone, the tablet terminal, and the notebook type personal computer. The server 500 may be configured to have one server or a plurality of servers.

The network N is a public communication network such as the Internet. The network N may be another communication network such as a wide area network (WAN). The network N may include wireless communication networks such as a cellular phone communication network such as the mobile phone and WiFi.

The requester who requests the valet parking of the vehicle can perform the request for the valet parking of the vehicle, a checking of a parking completion report, and the like using the requester terminal 300. The request for the valet parking of the vehicle, the checking of the parking completion report, and the like may be performed using a general application (mail software or browser software) or a dedicated application.

The substitute agent who performs the valet parking of the vehicle can receive a valet parking request of the vehicle and report parking completion using the substitute agent terminal 400. The reception of the valet parking request of the vehicle, the report of the parking completion, and the like may be performed using a general application (mail software or browser software) or a dedicated application. When the valet parking request of the vehicle is received, the substitute agent terminal 400 acquires authentication information for locking and unlocking the doors of the vehicle from the server 500.

The server 500 manages the valet parking request of the vehicle, the parking completion report, the authentication information, and the like. In the embodiment 1, the valet parking request of the vehicle 10 is sent from the requester terminal 300 to the substitute agent terminal 400 through the server 500, and the parking completion report of the vehicle 10 is sent from the substitute agent terminal 400 to the requester terminal 300 through the server 500.

The vehicle control device 100 performs various controls of the vehicle 10. In the embodiment 1, the vehicle control device 100 functions as a locking and unlocking device configured to perform the locking and the unlocking of the doors of the vehicle 10. For example, the vehicle control device 100 can communicate with the smart key or the key unit 200. The vehicle control device 100 acquires a key ID output from the smart key or the key unit 200 and permits the locking and the unlocking of the doors of the vehicle 10 when the acquired key ID matches the key ID stored in advance in the vehicle control device 100. When the locking and the unlocking of the doors are permitted, the vehicle control device 100 performs the locking and the unlocking of the doors of the vehicle 10 in response to a user operation on the smart key, the portable terminal, a switch provided in the door of the vehicle 10, and the like. It is possible to start the engine of the vehicle 10 by the same process as the process for locking and unlocking the doors of the vehicle 10.

The key unit 200 has the same configuration as the configuration of the smart key of the vehicle 10. The key unit 200 can communicate with the portable terminal (requester terminal 300 or substitute agent terminal 400) in addition to the communication with the vehicle control device 100. The key unit 200 acquires the authentication information output from the portable terminal and performs authentication using the acquired authentication information. When the authentication succeeds, the key unit 200 outputs the key ID of the vehicle 10 stored in advance in the key unit 200. As a result, determination is made that the key ID acquired from the key unit 200 by the vehicle control device 100 matches the key ID stored in advance in the vehicle control device 100, and the locking and the unlocking of the doors of the vehicle 10 are permitted. Therefore, even a person who does not hold the smart key can lock and unlock the doors of the vehicle 10 using the portable terminal instead of the smart key.

A method of performing the locking and the unlocking of the doors of the vehicle 10 using the portable terminal instead of the smart key is not limited to the above method. For example, the portable terminal may acquire and output the key ID, and the vehicle control device 100 may acquire the key ID output from the portable terminal and use the acquired key ID for the process.

The beacon 600 outputs a predetermined beacon signal to a predetermined transmission area around the vehicle 10 (beacon 600). The beacon signal of the beacon 600 includes a beacon ID for specifying the beacon 600. The transmission area is, for example, an area of several tens of meters in radius with an installation position of the beacon 600 as the center. Specifically, the transmission area is an area of 30 meters or more and 100 meters or less in radius. Another transmitter having the same function as the beacon may be used instead of the beacon 600.

Device Configuration

Figure 2:
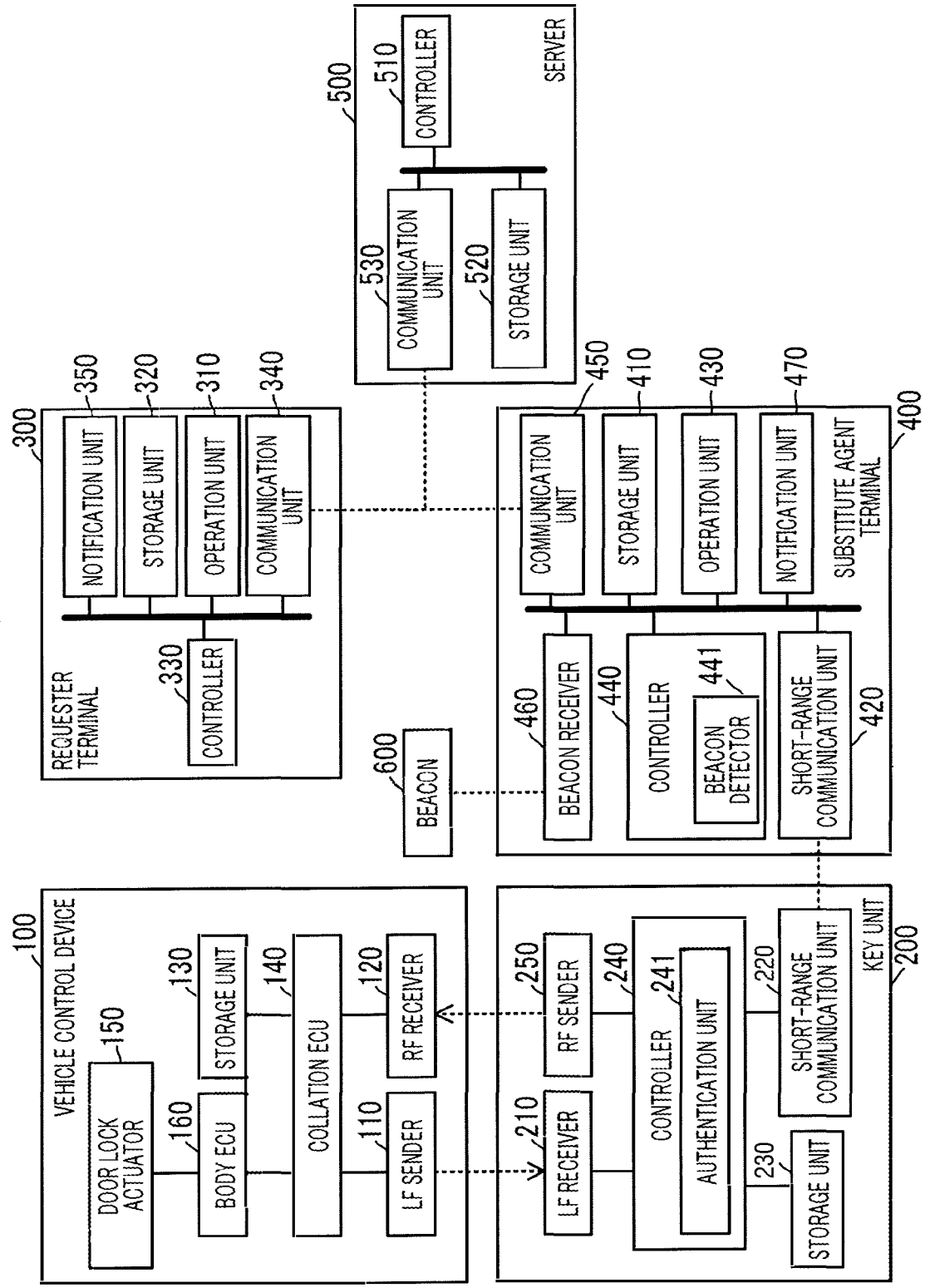
FIG. 2 shows a schematic configuration example of each device of the valet parking system of the vehicle according to the embodiment 1.

A configuration of each device of the valet parking system 1 of the vehicle will be schematically described. FIG. 2 shows a schematic configuration example of each device of the valet parking system 1 of the vehicle. In FIG. 2, the network N in FIG. 1 is omitted. As shown in FIG. 2, the vehicle control device 100 has an LF sender 110, an RF receiver 120, a storage unit 130, a collation electronic control unit (ECU) 140, a door lock actuator 150, and a body ECU 160. The key unit 200 has an LF receiver 210, a short-range communication unit 220, a storage unit 230, a controller 240, and an RF sender 250. The requester terminal 300 has an operation unit 310, a storage unit 320, a controller 330, a communication unit 340, and a notification unit 350. The substitute agent terminal 400 has a storage unit 410, a short-range communication unit 420, a controller 440, a communication unit 450, a beacon receiver 460, and a notification unit 470. The server 500 has a controller 510, a storage unit 520, and a communication unit 530.

Configuration of Vehicle Control Device 100

A configuration of the vehicle control device 100 will be described in detail.

The LF sender 110 sends a radio wave of a low frequency (LF) band for detecting (polling) the key unit 200 or the smart key. The LF band is, for example, a frequency band of 100 kHz or more and 300 kHz or less.

The RF receiver 120 receives a radio wave of a high frequency (RF) band sent from the key unit 200 or the smart key. The RF band is, for example, a frequency band of 100 MHz or more and 1 GHz or less. For example, the RF receiver 120 receives a radio wave indicating the key ID, locking and unlocking information for instructing the locking or the unlocking of the doors of the vehicle 10.

The storage unit 130 stores various pieces of information (data) such as the key ID of the vehicle 10, a program executed by the collation ECU 140, and a program executed by the body ECU 160. For example, the storage unit 130 is a semiconductor memory, a magnetic disk, an optical disk, or the like.

The collation ECU 140 analyzes the radio wave received by the RF receiver 120. For example, the collation ECU 140 determines whether the key ID acquired by the RF receiver 120 matches the key ID of the vehicle 10 stored in advance in the storage unit 130. When the determination is made that the key ID acquired by the RF receiver 120 matches the key ID of the vehicle 10 stored in advance in the storage unit 130, the collation ECU 140 permits the locking and the unlocking of the doors of the vehicle 10. When the locking and the unlocking of the doors are permitted, the collation ECU 140 outputs locking and unlocking control signals for controlling the locking and the unlocking of the doors of the vehicle 10 according to the locking and unlocking information acquired by the RF receiver 120.

The door lock actuator 150 is an actuator (motor or the like) configured to perform the locking and the unlocking of the doors of the vehicle 10.

The body ECU 160 performs the overall control of the vehicle 10. For example, the body ECU 160 drives the door lock actuator 150 such that the locking or the unlocking of the doors of the vehicle 10 is performed according to the locking and unlocking control signals output from the collation ECU 140. The locking and unlocking control signals, a drive signal for driving the door lock actuator 150, and the like are sent through an in-vehicle network such as a controller area network (CAN). The collation ECU 140 and the body ECU 160 may be integrally configured.

Configuration of Key Unit 200

A configuration of the key unit 200 will be described in detail.

The LF receiver 210 receives a polling signal (radio wave of RF band) output from the vehicle control device 100 (LF sender 110).

The short-range communication unit 220 is configured to be able to communicate in a communication area around the vehicle 10 (key unit 200). The communication area of the short-range communication unit 220 is narrower than the transmission area of the beacon 600. The short-range communication unit 220 communicates with the portable terminal (requester terminal 300 or substitute agent terminal 400) and acquires the authentication information from the portable terminal. For example, the short-range communication unit 220 performs near field communication in accordance with a predetermined wireless communication standard. Specifically, the short-range communication unit 220 performs the communication in accordance with the standard such as Bluetooth (registered trademark) Low Energy (BLE), near field communication (NFC), ultra wide band (UWB), or WiFi.

The storage unit 230 stores various pieces of information (data) such as reference information referred to by the authentication using the authentication information, the key ID of the vehicle 10, and a program executed by the controller 240. For example, the storage unit 230 is the semiconductor memory, the magnetic disk, the optical disk, or the like.

The controller 240 is a processor (central processing unit (CPU) or digital signal processor (DSP)) configured to perform the overall control of the key unit 200. The controller 240 has an authentication unit 241. The authentication unit 241 performs the authentication using the authentication information acquired by the short-range communication unit 220. When the authentication by the authentication unit 241 succeeds, the controller 240 instructs the RF sender 250 to output the key ID or the locking and unlocking information. The controller 240 may read and execute the program stored in advance in the storage unit 230 to realize various functions including the authentication unit 241 or may not read and execute the program. The various functions including the authentication unit 241 may be realized by hardware.

The authentication unit 241 determines that the authentication succeeds when the authentication information acquired by the short-range communication unit 220 satisfies a predetermined condition and determines that the authentication fails when the authentication information does not satisfy the predetermined condition. The predetermined condition is, for example, any of the following conditions 1 to 3.

Condition 1: The authentication information matches the reference information.

Condition 2: A result of performing a predetermined process (encryption process, decryption process, or the like) on one piece of the authentication information and the reference information matches the other piece of the authentication information and the reference information.

Condition 3: A result of performing the predetermined process (encryption process, decryption process, or the like) on the authentication information matches a result of performing the process on the reference information.

The RF sender 250 sends a radio wave (radio wave of the RF band) indicating the key ID or the locking and unlocking information in response to the instruction from the controller 240. Specifically, the RF sender 250 sends the radio wave indicating the key ID of the vehicle 10 stored in advance in the storage unit 230, sends the radio wave indicating the locking and unlocking information generated by the controller 240, or sends the radio wave indicating both the key ID and the locking and unlocking information. An acquisition method of the key ID or the locking and unlocking information is not particularly limited. For example, an encryption key ID (encrypted key ID) may be stored in advance in the storage unit 230, and the controller 240 may perform the decryption process using the authentication information on the encryption key ID to generate a key ID (not encrypted key ID; decryption key ID). The short-range communication unit 220 may acquire the locking and unlocking information output from the portable terminal.

Configuration of Requester Terminal 300

A configuration of the requester terminal 300 will be described in detail. The requester terminal 300 is carried by the requester.

The operation unit 310 accepts a user operation on the requester terminal 300. For example, the operation unit 310 accepts a request operation and the like for the valet parking request of the vehicle.

The storage unit 320 stores various pieces of information (data) such as the parking completion report acquired by the requester terminal 300 and a program executed by the controller 330. For example, the storage unit 320 is the semiconductor memory, the magnetic disk, the optical disk, or the like.

The controller 330 is a processor (CPU or DSP) configured to perform the overall control of the requester terminal 300. The controller 330 instructs the communication unit 340 to output request information for the valet parking request of the vehicle in response to the request operation. The request information includes requester information for specifying the requester, vehicle information for specifying the vehicle 10, predetermined beacon related information relating to the beacon 600, position information relating to a position (current position) of the vehicle 10, and the like. For example, the requester information is an ID, a name, an age, a gender, or the like of the requester. The vehicle information is an ID, a vehicle type, a color, a plate number, or the like of the vehicle 10. The beacon related information is the beacon ID or the like of the beacon 600. The position information is latitude and longitude of the current position or the like of the vehicle 10.

The request information may not include the requester information. The requester information may be input to the requester terminal 300 by the request operation or may be stored in advance in the storage unit 320. The requester information may be registered in advance in the server 500. The same applies to the vehicle information or the beacon related information. The request information may not include the position information. A receiver of a satellite positioning system such as a global positioning system (GPS) may acquire information obtained by the satellite positioning system as the position information. The receiver may be provided in the requester terminal 300 or in the vehicle 10. When the receiver is provided in the requester terminal 300, the receiver can acquire information received in a state where the requester is in the vehicle 10, in a state where the requester is around the vehicle 10, or the like as the position information of the vehicle 10. When the receiver is provided in the vehicle 10, the requester terminal 300 or the server 500 acquires the position information acquired by the receiver from the vehicle 10. The position information may be input to the requester terminal 300 by the request operation.

The communication unit 340 communicates with the server 500. For example, the communication unit 340 outputs the request information to the server 500 in response to the instruction from the controller 330. The request information is output from the server 500 to the substitute agent terminal 400. Therefore, the substitute agent is demanded to perform the valet parking of the vehicle 10 based on a demand from the requester by the process of the communication unit 340. The communication unit 340 acquires the parking completion report from the server 500. The controller 330 stores (records) the parking completion report acquired by the communication unit 340 in the storage unit 320.

The notification unit 350 notifies the requester of the parking completion report acquired by the communication unit 340. For example, the notification unit 350 has a speaker or a display unit and notifies the requester of the parking completion report by a voice output or an image display.

At least some processes performed by the requester terminal 300 may be performed by the on-vehicle device of the vehicle 10. For example, a process (output of request information or the like) performed by the communication unit 340 for demanding the valet parking of the vehicle may be performed by the on-vehicle device.

Configuration of Substitute Agent Terminal 400

A configuration of the substitute agent terminal 400 will be described. The substitute agent terminal 400 is carried by the substitute agent.

The storage unit 410 stores various pieces of information (data) such as information (request information or authentication information) acquired by the communication unit 450, a program executed by the controller 440, and the like.

The short-range communication unit 420 is configured to be able to communicate in a communication area around the substitute agent (substitute agent terminal 400). The short-range communication unit 420 communicates with the key unit 200 (short-range communication unit 220). For example, the short-range communication unit 420 performs the near field communication in accordance with the predetermined wireless communication standard (standard such as BLE, NFC, UWB, and WiFi). In the embodiment 1, after the acquisition of the request information by the substitute agent terminal 400 is checked, the substitute agent heads toward the vehicle 10. When the substitute agent (substitute agent terminal 400) enters the communication area of the short-range communication unit 220, the short-range communication unit 420 outputs the authentication information acquired by the substitute agent terminal 400 to the short-range communication unit 220. Accordingly, it is possible to achieve the valet parking accompanying the locking and unlocking of the vehicle 10.

The operation unit 430 accepts a user operation on the substitute agent terminal 400. For example, the operation unit 430 accepts the completion operation for notifying the requester terminal 300 of the completion of the valet parking of the vehicle or the like.

The controller 440 is a processor (CPU or DSP) configured to perform the overall control of the substitute agent terminal 400. The controller 440 instructs the communication unit 450 to output the parking completion report in response to a completion operation. After the substitute agent locks the doors of the vehicle 10 from the outside of the vehicle 10 and performs the completion operation, the controller 440 deletes the authentication information from the storage unit 410. Accordingly, it is possible to suppress getting in or driving of the vehicle 10 by the substitute agent after the parking is completed.

Invalidation of the authentication information is not limited to the deletion of the authentication information. For example, the authentication information may be invalidated by rewriting of the authentication information. The number of usable times and a usable period of the same authentication information may be limited. Whether the number of use times exceeds the number of usable times, whether a current time point is within the usable period, or the like can be determined by the key unit 200 or the substitute agent terminal 400.

The communication unit 450 communicates with the server 500. For example, the communication unit 450 acquires the request information or the authentication information from the server 500. The communication unit 450 outputs the parking completion report (position information) to the server 500 in response to the instruction from the controller 440.

The beacon receiver 460 receives a beacon signal. When the substitute agent (substitute agent terminal 400) enters the transmission area of the beacon 600, the beacon receiver 460 receives the beacon signal emitted from the beacon 600.

The controller 440 has a beacon detector 441. The beacon detector 441 detects that the beacon signal of the beacon 600 is received by the beacon receiver 460 based on the request information (beacon related information) acquired by the communication unit 450 and the beacon signal received by the beacon receiver 460. Specifically, when a beacon ID received by the beacon receiver 460 matches the beacon ID of the beacon 600, the beacon detector 441 determines that the beacon signal of the beacon 600 is received by the beacon receiver 460. When the beacon ID received by the beacon receiver 460 does not match the beacon ID of the beacon 600, the beacon detector 441 determines that a beacon signal of a beacon different from the beacon 600 is received by the beacon receiver 460. A method of determining whether the beacon signal of the beacon 600 is received by the beacon receiver 460 is not limited to the above method. The controller 440 may or may not realize various functions including the function of the beacon detector 441 by reading and executing the program stored in advance in the storage unit 410. The various functions including the function of the beacon detector 441 may be realized by hardware.

The notification unit 470 performs various notifications to the substitute agent. For example, the notification unit 470 performs a request notification, a position notification, a beacon notification, and the like. The request notification is a notification of the request information acquired by the communication unit 450 and is, for example, a notification that there is a request for the valet parking of the vehicle. The position notification is a notification based on the position information and is, for example, a notification of the current position of the vehicle 10. The beacon notification is a notification based on a detection result of the beacon detector 441 and is, for example, a notification that the substitute agent enters the transmission area of the beacon 600. The beacon notification is automatically performed when the beacon signal of the beacon 600 is received by the beacon receiver 460. Specifically, when the beacon detector 441 determines that the beacon signal of the beacon 600 is received by the beacon receiver 460, the beacon notification is automatically performed. A method of realizing various notifications is not particularly limited. However, for example, the notification unit 470 has a speaker or a display unit and realizes the various notifications by a voice output or an image display.

The notification unit 470 may or may not have a plurality of function units configured to respectively perform a plurality of notifications. The notifications may be performed by one function unit. One notification may be performed by the function units. The request notification or the position notification may not be performed. However, when the request notification is performed, the substitute agent heads toward the vehicle 10 and can move and park the vehicle 10 solely when there is the request from the requester. When the position notification is performed, the substitute agent can easily approach the vehicle 10 based on the position information and can easily receive the beacon notification. When the beacon signal is received by the beacon receiver 460, the beacon notification may be automatically performed independently of a process result of the beacon detector 441. However, when the process result of the beacon detector 441 is considered, it is possible to suppress the beacon notification (erroneous notification) due to reception of the beacon signal of the beacon different from the beacon 600.

Configuration of Server 500

A configuration of the server 500 will be described. The controller 510 is a processor (CPU or DSP) configured to perform the overall control of the server 500. The storage unit 520 stores various pieces of information (data). For example, the storage unit 520 is the semiconductor memory, the magnetic disk, the optical disk, or the like. The storage unit 520 stores in advance the authentication information for each vehicle. The communication unit 530 communicates with the requester terminal 300 or the substitute agent terminal 400 (communication unit 340 or the communication unit 450).

For example, the communication unit 530 acquires the request information from the requester terminal 300. When the communication unit 530 acquires the request information from the requester terminal 300, the controller 510 instructs the communication unit 530 to output the request information and the authentication information of the vehicle 10 stored in the storage unit 520. The communication unit 530 outputs the request information acquired from the requester terminal 300 and the authentication information of the vehicle 10 to the substitute agent terminal 400 in response to the instruction from the controller 510.

The communication unit 530 acquires the parking completion report from the substitute agent terminal 400. When the communication unit 530 acquires the parking completion report from the substitute agent terminal 400, the controller 510 instructs the communication unit 530 to output the parking completion report. The communication unit 530 outputs the parking completion report acquired from the substitute agent terminal 400 to the requester terminal 300 in response to the instruction from the controller 510.

Process Flow of Valet Parking System 1 of Vehicle

Figure 3:
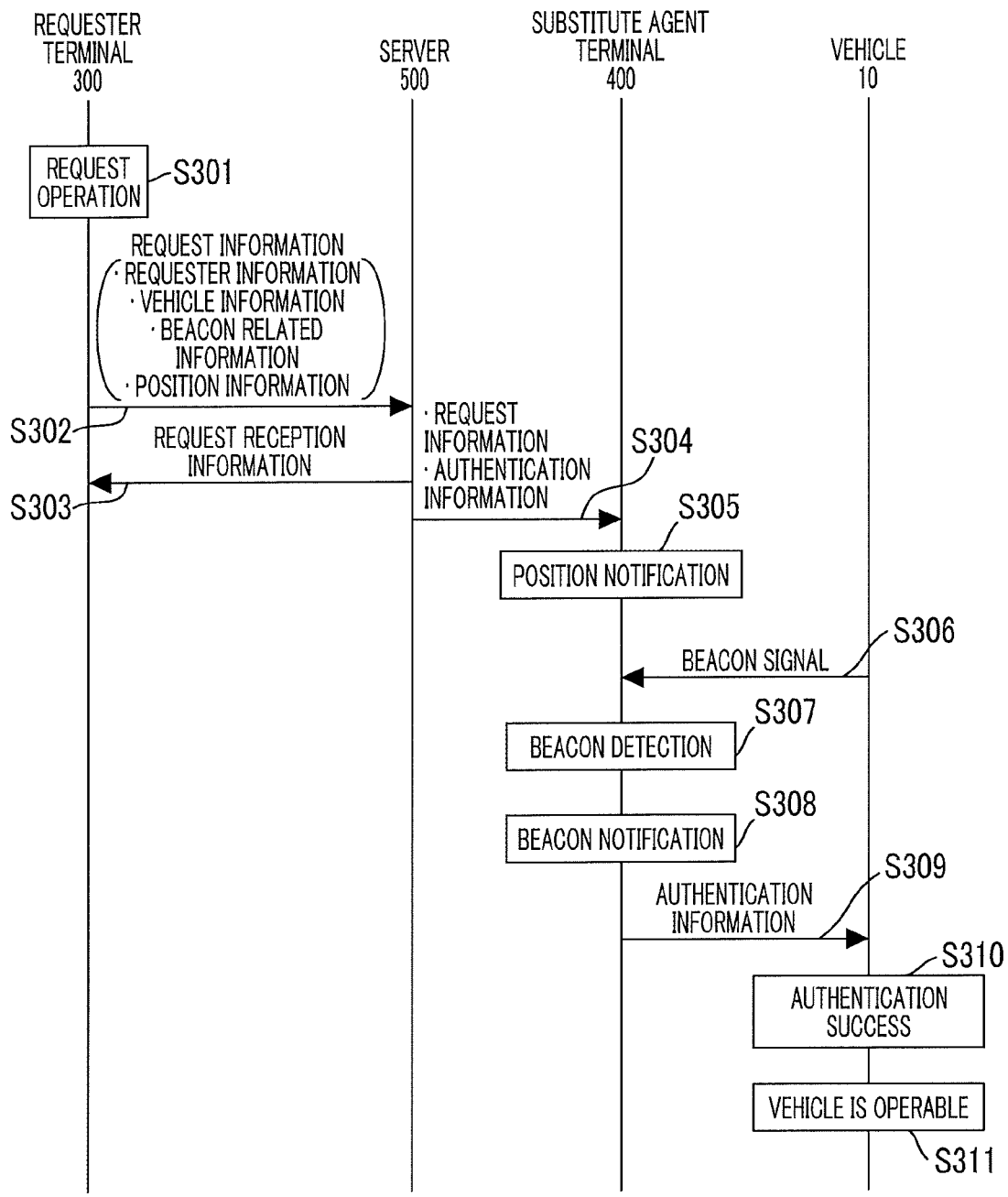
FIG. 3 shows a process flow example of the valet parking system of the vehicle according to the embodiment 1.
Figure 4:
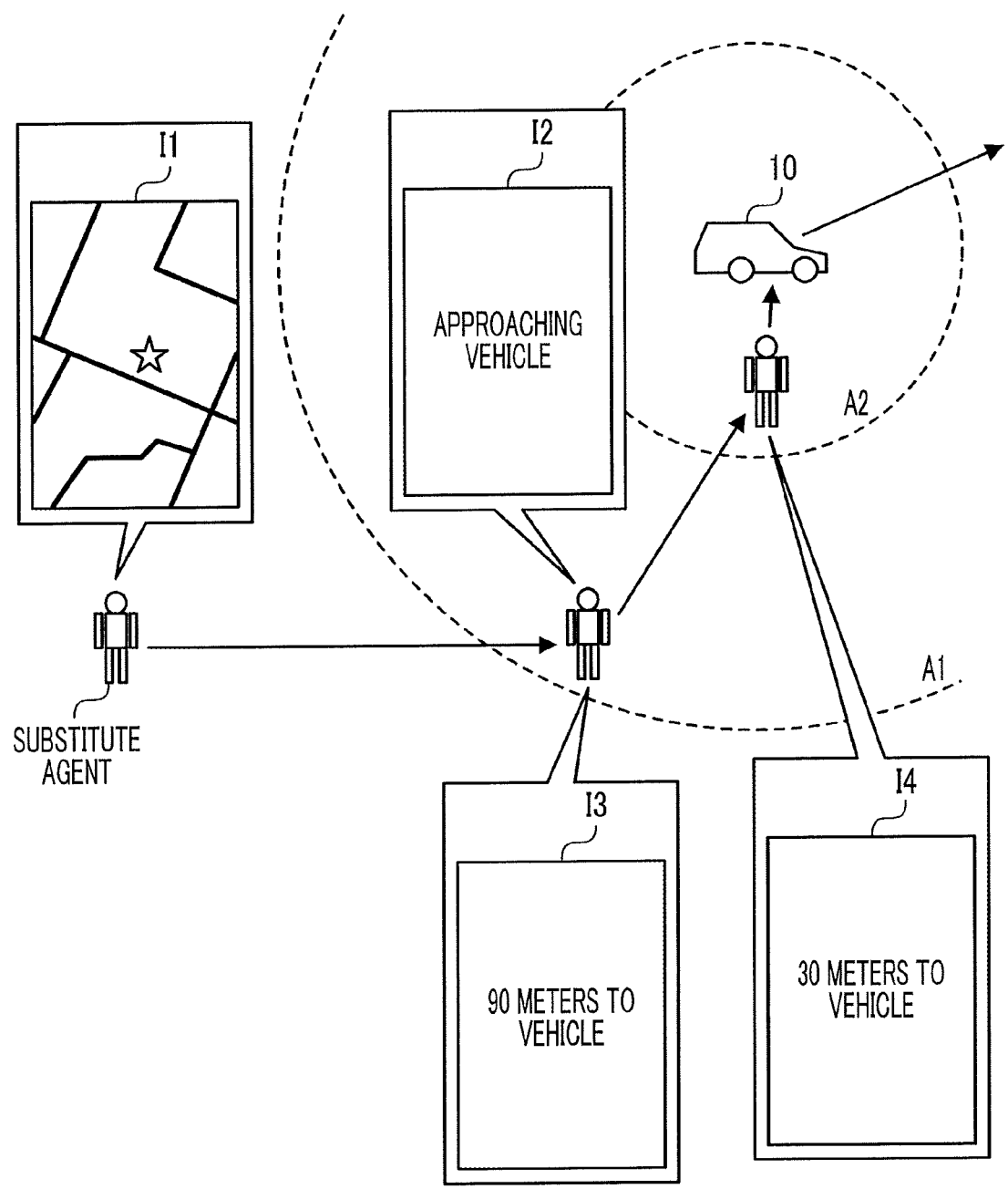
FIG. 4 shows an example of a state where a substitute agent finds a target vehicle in the embodiment 1.

A process flow of the valet parking system 1 of the vehicle will be described. FIG. 3 is a sequence diagram showing a process flow example of the valet parking system 1 of the vehicle. FIG. 4 schematically shows an example of a state where the substitute agent finds the vehicle 10.

First, the requester performs the request operation on the operation unit 310 of the requester terminal 300 (step S301 in FIG. 3). Next, the communication unit 340 of the requester terminal 300 outputs the request information (requester information, vehicle information, beacon related information, position information, or the like) to the communication unit 530 of the server 500 in response to the request operation (step S302 in FIG. 3). The communication unit 530 returns request reception information to the communication unit 340 in response to the acquisition of the request information (step S303 in FIG. 3). The request reception information indicates, for example, that the request information is acquired, the valet parking request of the vehicle is received, and the like. Accordingly, the requester can grasp that the valet parking request of the vehicle is successfully performed by checking the request reception information.

Next, the communication unit 530 of the server 500 outputs the request information and the authentication information of the vehicle 10 to the communication unit 450 of the substitute agent terminal 400 in response to the acquisition of the request information (step S304 in FIG. 3). The request information that is output from the server 500 to the substitute agent terminal 400 may or may not be the same as the request information that is output from the requester terminal 300 to the server 500. For example, the request information that is output from the requester terminal 300 to the server 500 includes the requester information and the vehicle information. The request information that is output from the server 500 to the substitute agent terminal 400 may not include at least one of the requester information and the vehicle information. However, when the request information that is output from the server 500 to the substitute agent terminal 400 includes the vehicle information, the substitute agent can easily find the vehicle 10 since the vehicle information can be checked. Information including solely the beacon related information and the position information may be output from the server 500 to the substitute agent terminal 400 as the request information.

The notification unit 470 of the substitute agent terminal 400 performs the position notification to the substitute agent based on the request information (position information) acquired by the communication unit 450 of the substitute agent terminal 400 (step S305 in FIG. 3). For example, as shown in FIG. 4, the notification unit 470 (display unit) displays a map image I1 indicating a position (star in FIG. 4) obtained by the satellite positioning system. The substitute agent can easily approach the vehicle 10 by checking the map image I1. Since there is a case where the vehicle 10 moves, it is preferable that the position information is repeatedly sent from the requester terminal 300 to the substitute agent terminal 400 through the server 500. The substitute agent approaches the vehicle 10 to enter a transmission area A1 of the beacon 600 (FIG. 4).

When substitute agent (substitute agent terminal 400) enters the transmission area A1, the beacon receiver 460 of the substitute agent terminal 400 receives the beacon signal emitted from the beacon 600 (step S306 in FIG. 3). The beacon detector 441 of the substitute agent terminal 400 detects that the beacon signal of the beacon 600 is received by the beacon receiver 460 (step S307 in FIG. 3; detection of the beacon 600). Specifically, determination is made that the beacon ID (beacon ID included in beacon signal) received by the beacon receiver 460 matches the beacon ID (beacon ID included in request information) acquired by the communication unit 450 of the substitute agent terminal 400. As a result, the determination is made that the beacon signal of the beacon 600 is received by the beacon receiver 460.

The notification unit 470 of the substitute agent terminal 400 automatically performs the beacon notification to the substitute agent in response to the detection of the beacon 600 (step S308 in FIG. 3). For example, as shown in FIG. 4, the notification unit 470 displays a graphic I2 (text or icon) indicating that the vehicle 10 is close. The substitute agent can easily grasp that the vehicle 10 is close by checking the graphic I2 and thus can easily find the vehicle 10. When the substitute agent further approaches the vehicle 10, the substitute agent enters a communication area A2 of the short-range communication unit 220 provided in the key unit 200.

When the substitute agent (substitute agent terminal 400) enters the communication area A2, the authentication information (authentication information of vehicle 10) acquired by the communication unit 450 of the substitute agent terminal 400 is sent from the short-range communication unit 420 of the substitute agent terminal 400 to the short-range communication unit 220 of the key unit 200 (step S309 in FIG. 3). The authentication unit 241 of the key unit 200 succeeds in the authentication using the authentication information acquired by the short-range communication unit 220 (step S310 in FIG. 3). When the authentication of the authentication information succeeds, various processes (processes of vehicle control device 100 or key unit 200) described above are performed, and a vehicle operation performed by the substitute agent to the vehicle 10 for the valet parking of the vehicle can be executed (step S311 in FIG. 3). The vehicle operation by the substitute agent is an operation to perform an instruction to lock and unlock the doors of the vehicle 10, an operation to perform an instruction to start the engine of the vehicle 10, and the like. The substitute agent gets in the vehicle 10 and moves and parks the vehicle 10 instead of the requester (FIG. 4). The substitute agent may have a spare key or the like of the vehicle 10 and perform the vehicle operation using the spare key.

Summary

According to the embodiment 1, as described above, when the predetermined beacon signal is output to the area around the vehicle 10 and the substitute agent terminal 400 receives the predetermined beacon signal, the beacon notification to the substitute agent is automatically performed. Accordingly, since the substitute agent can easily grasp that the vehicle 10 is close by the beacon notification, it is possible for the substitute agent to easily find the vehicle 10 under various situations. For example, even when the vehicles are crowded, it is possible for the substitute agent to easily find the vehicle 10 from the vehicles.

It is possible to obtain a distance to the beacon that emits the beacon signal by analyzing the beacon signal. Therefore, the beacon notification may be notification relating to a distance between the substitute agent and the beacon 600. The distance between the substitute agent and the beacon 600 corresponds to a distance between the substitute agent and the vehicle 10. For example, as shown in FIG. 4, the notification unit 470 of the substitute agent terminal 400 may display graphics 13, 14 indicating the distance to the vehicle 10 (beacon 600). Accordingly, the substitute agent can easily grasp the distance to the vehicle 10, the approaching to the vehicle 10, or the like by checking the graphics 13, 14 and thus can find the vehicle 10 more easily.

The position notification may be a guidance to the position of the vehicle 10. Accordingly, the substitute agent can easily approach the vehicle 10 by simply moving according to the guidance and easily receive the beacon notification.

Embodiment 2

Hereinafter, an embodiment 2 of the disclosure will be described with reference to drawings. In the following description, points (configurations or processes) different from the embodiment 1 will be described in detail, and the description of the same points as the embodiment 1 will be omitted. In the embodiment 2, an example that the substitute agent can find the target vehicle more easily will be described.

System Configuration

Figure 5:
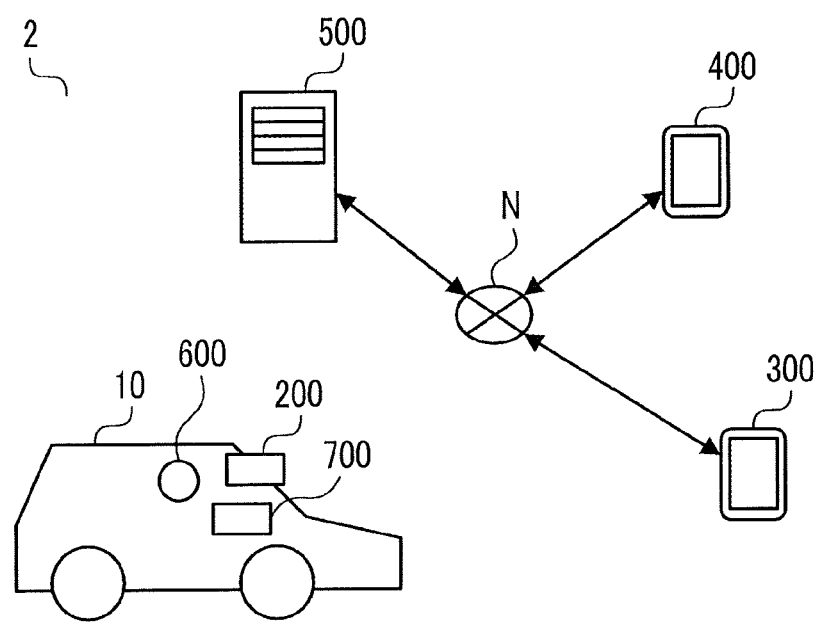
FIG. 5 shows a schematic configuration example of a valet parking system of a vehicle according to an embodiment 2.

A configuration of a valet parking system according to the embodiment 2 will be described. FIG. 5 shows a schematic configuration example of a valet parking system 2 of the vehicle according to the embodiment 2. The configuration of the valet parking system 2 of the vehicle is the same as the configuration of the embodiment 1 (FIG. 1). However, the valet parking system 2 of the vehicle has a vehicle control device 700 instead of the vehicle control device 100 in the embodiment 1. The vehicle control device 700 has the same function as the vehicle control device 100. However, the vehicle control device 700 can also communicate with the portable terminal (requester terminal 300 or substitute agent terminal 400).

Configuration of Vehicle Control Device 700

Figure 6:
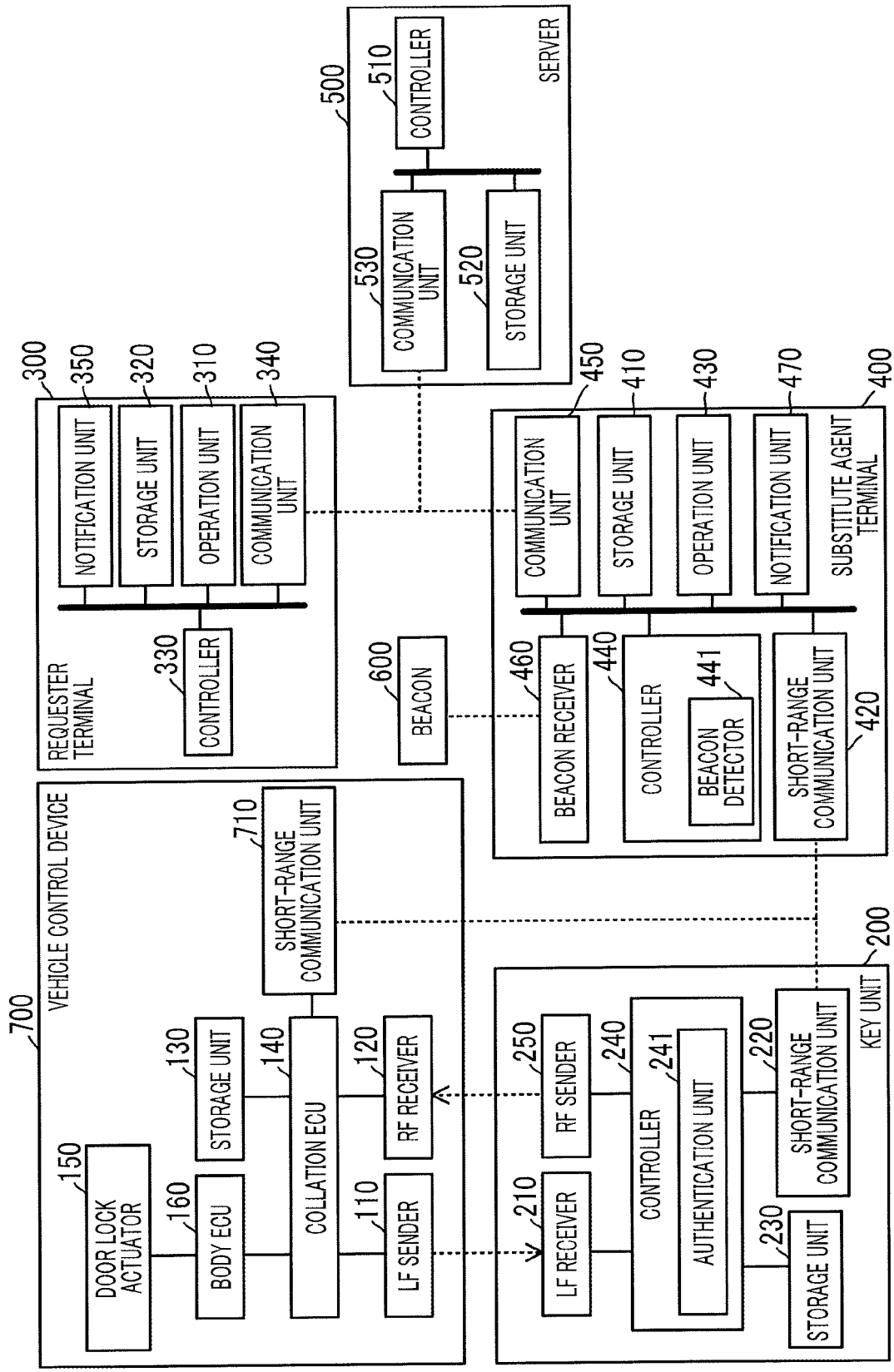
FIG. 6 shows a schematic configuration example of each device of the valet parking system of the vehicle according to the embodiment 2.

A configuration of the vehicle control device 700 will be described. FIG. 6 shows a schematic configuration example of each device of the valet parking system 2 of the vehicle. In FIG. 6, the network N in FIG. 5 is omitted. The vehicle control device 700 has each unit included in the vehicle control device 100 in the embodiment 1 and a short-range communication unit 710.

The short-range communication unit 710 is configured to be able to communicate in a communication area around the vehicle 10 (vehicle control device 700). The communication area of the short-range communication unit 710 is narrower than the transmission area of the beacon 600 and is wider the communication area of the short-range communication unit 220. The short-range communication unit 710 communicates with the portable terminal (requester terminal 300 or the substitute agent terminal 400) to acquire notification permission information from the portable terminal. For example, the short-range communication unit 710 performs the near field communication in accordance with the predetermined wireless communication standard (standard such as BLE, NFC, UWB, and WiFi).

In the collation ECU 140 and the body ECU 160 in the embodiment 2, the following process is further performed.

The collation ECU 140 in the embodiment 2 analyzes the notification permission information acquired by the short-range communication unit 710. For example, the collation ECU 140 determines whether the notification permission information acquired by the short-range communication unit 710 matches notification permission information of the vehicle 10 stored in advance in the vehicle control device 700 (storage unit 130). When the determination is made that the notification permission information acquired by the short-range communication unit 710 matches the notification permission information of the vehicle 10, the collation ECU 140 outputs a notification control signal for the notification (vehicle notification) by the vehicle 10. A method of analyzing the notification permission information is not limited as long as it is possible to detect that the notification permission information of the vehicle 10 is acquired by the short-range communication unit 710.

The body ECU 160 in the embodiment 2 drives hazard lamps such that the hazard lamps of the vehicle 10 blink in response to the notification control signal output from the collation ECU 140. The notification control signal and a drive signal for driving the hazard lamps are sent through the in-vehicle network such as the CAN.

In the embodiment 2, when the authentication information of the vehicle 10 is acquired, the substitute agent terminal 400 also acquires the notification permission information of the vehicle 10 from the server 500. When the substitute agent (substitute agent terminal 400) enters the communication area of the short-range communication unit 710, the substitute agent terminal 400 outputs the acquired notification permission information to the short-range communication unit 710. Accordingly, the vehicle notification by the blinking of the hazard lamps of the vehicle 10 is automatically performed to the substitute agent.

The vehicle notification is not limited to the blinking of the hazard lamps. For example, a horn sound may be output as the vehicle notification. The vehicle notification may be automatically performed when the vehicle control device communicates with another device instead of using the notification permission information. However, when the notification permission information is used, it is possible to suppress the vehicle notification (erroneous notification) due to unintended communication.

Process Flow of Valet Parking System 2 of Vehicle

Figure 7:
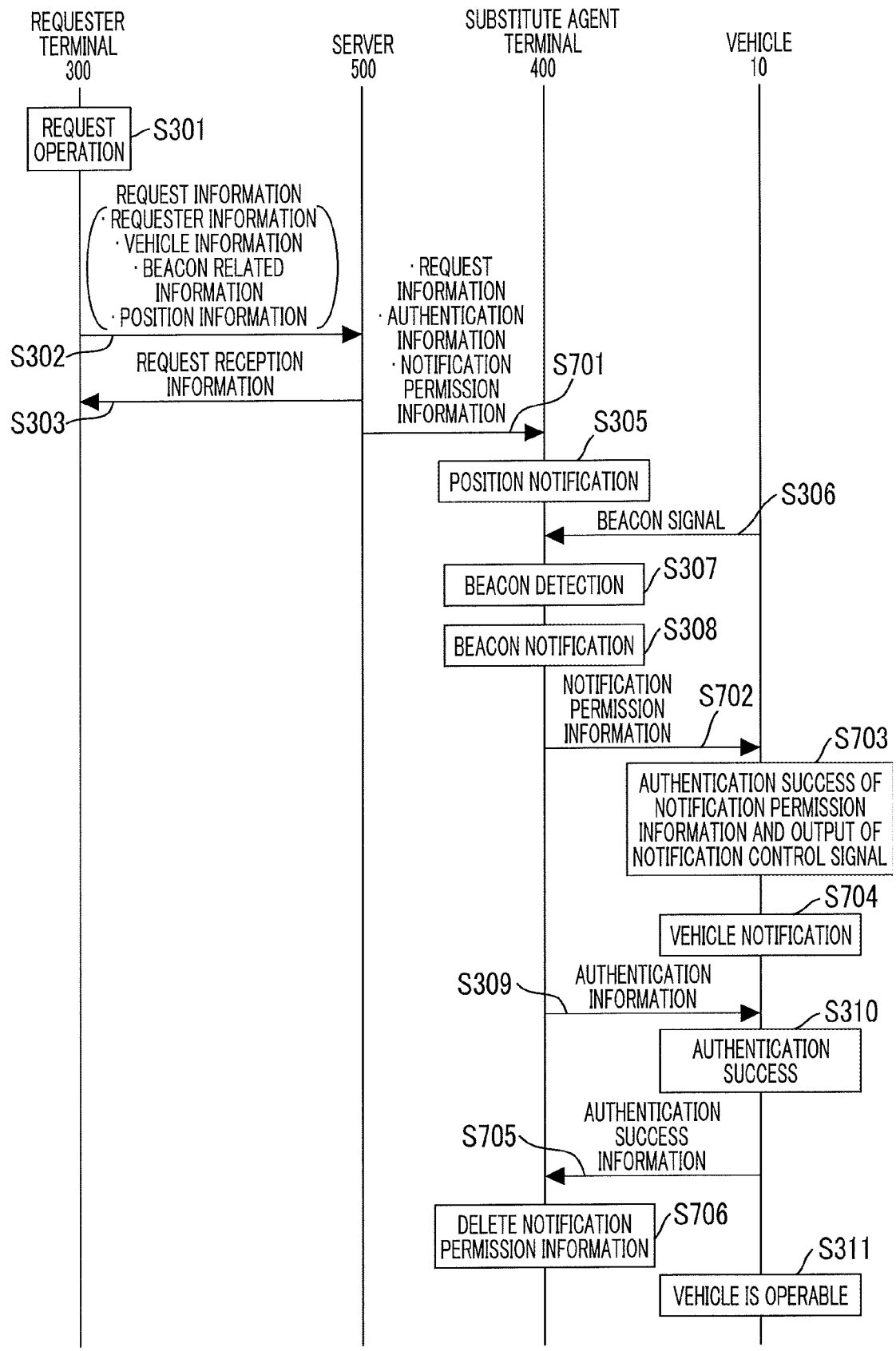
FIG. 7 shows a process flow example of the valet parking system of the vehicle according to the embodiment 2.
Figure 8:
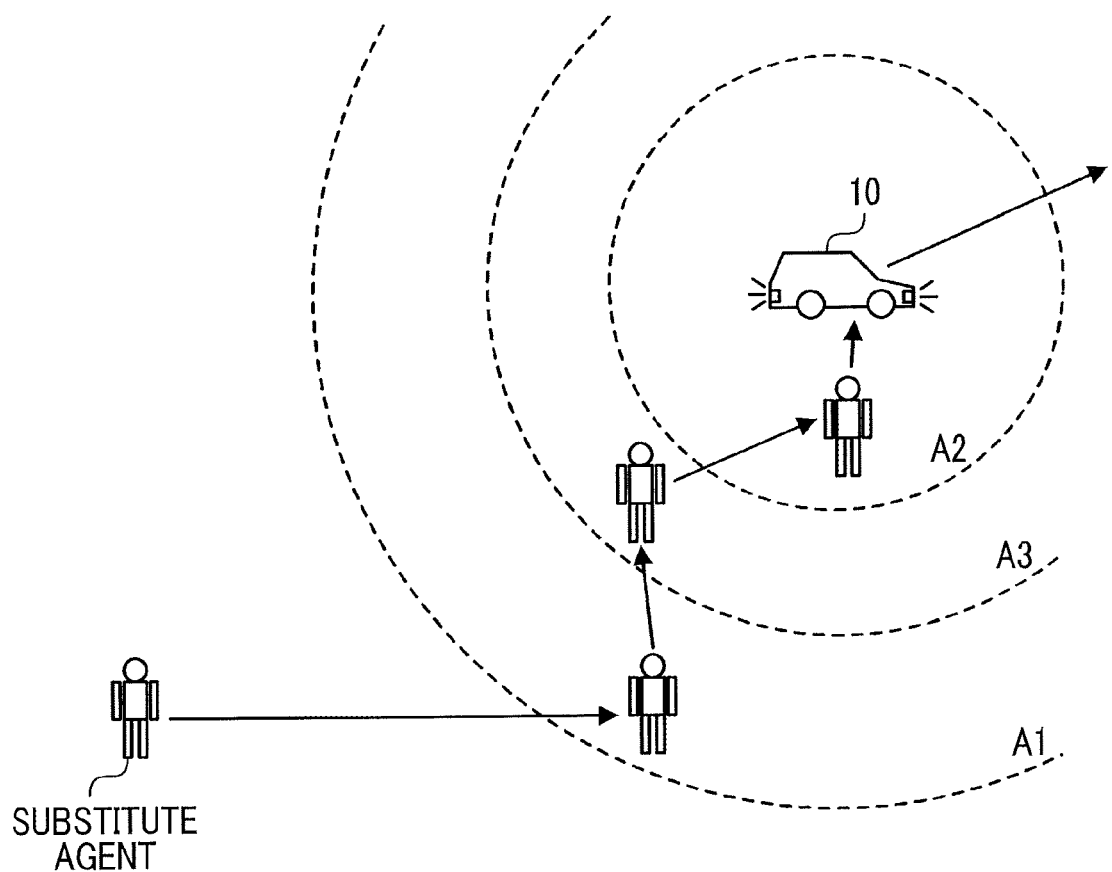
FIG. 8 shows an example of a state where a substitute agent finds a target vehicle in the embodiment 2.

A process flow of the valet parking system 2 of the vehicle will be described. FIG. 7 is a sequence diagram showing a process flow example of the valet parking system 2 of the vehicle. FIG. 8 schematically shows an example of a state where the substitute agent finds the vehicle 10.

First, similarly to the embodiment 1, the requester performs the request operation, the requester terminal 300 outputs the request information to the server 500, and the server 500 returns the request reception information to the requester terminal 300 (steps S301 to S303 in FIG. 7). Next, the communication unit 530 of the server 500 outputs the request information, the authentication information of the vehicle 10, and the notification permission information of the vehicle 10 to the communication unit 450 of the substitute agent terminal 400 in response to the acquisition of the request information (step S701 in FIG. 7). The storage unit 520 of the server 500 stores in advance the notification permission information of each vehicle. The controller 440 of the substitute agent terminal 400 records the information acquired from the server 500 in the storage unit 410 of the substitute agent terminal 400.

Similarly to the embodiment 1, the substitute agent terminal 400 performs the position notification (step S305 in FIG. 7). Thereafter, the substitute agent approaches the vehicle 10 based on the position notification to enter the transmission area A1 of the beacon 600 (FIG. 8). When the substitute agent enters the transmission area A1, similarly to the embodiment 1, the substitute agent terminal 400 receives the beacon signal emitted from the beacon 600 to detect the beacon 600 (steps S306, S307 in FIG. 7). Similarly to the embodiment 1, the substitute agent terminal 400 automatically performs the beacon notification to the substitute agent (step S308 in FIG. 7). Thereafter, the substitute agent further approaches the vehicle 10 based on the beacon notification to enter a communication area A3 of the short-range communication unit 710 provided in the vehicle control device 700 before the substitute agent enters the communication area A2 of the short-range communication unit 220 provided in the key unit 200 (FIG. 8).

When the substitute agent (substitute agent terminal 400) enters the communication area A3, the notification permission information (notification permission information of vehicle 10) acquired by the communication unit 450 of the substitute agent terminal 400 is sent from the short-range communication unit 420 of the substitute agent terminal 400 to the short-range communication unit 710 of the vehicle control device 700 (step S702 in FIG. 7). Next, the collation ECU 140 of the vehicle control device 700 succeeds in the authentication using the notification permission information acquired by the short-range communication unit 710 and outputs the notification control signal (step S703 in FIG. 7). Specifically, determination is made that the notification permission information acquired by the short-range communication unit 710 matches the notification permission information of the vehicle 10 and the notification control signal is output.

The body ECU 160 of the vehicle control device 700 drives the hazard lamps such that the hazard lamps of the vehicle 10 blink in response to the notification control signal output from the collation ECU 140 (step S704 in FIG. 7; hazard lamps of vehicle 10 in FIG. 8 blink; vehicle notification). The substitute agent can find the vehicle 10 more easily than in the embodiment 1 by noticing the blinking of the hazard lamps of the vehicle 10. When the substitute agent further approaches the vehicle 10, the substitute agent enters the communication area A2 of the short-range communication unit 220 provided in the key unit 200 (FIG. 8).

When the substitute agent enters the communication area A2, similarly to the embodiment 1, the authentication information is sent from the substitute agent terminal 400 to the key unit 200, and the key unit 200 succeeds in the authentication of the authentication information (steps S309, S310 in FIG. 7). When the key unit 200 succeeds in the authentication of the authentication information succeeds, the short-range communication unit 220 of the key unit 200 outputs authentication success information to the short-range communication unit 420 of the substitute agent terminal 400 (step S705 in FIG. 7). The authentication success information indicates that the authentication of the authentication information is successful or the like. The controller 440 of the substitute agent terminal 400 deletes the notification permission information of the vehicle 10 from the storage unit 410 of the substitute agent terminal 400 in response to the acquisition of the authentication success information (step S706 in FIG. 7). Accordingly, it is possible to suppress the vehicle notification after the substitute agent finds the vehicle 10. Similarly to the embodiment 1, the various processes (processes of vehicle control device 100 or the key unit 200) are performed, and the vehicle operation performed by the substitute agent to the vehicle 10 for the valet parking of the vehicle can be executed (step S311 in FIG. 7). The substitute agent gets in the vehicle 10 and moves and parks the vehicle 10 instead of the requester (FIG. 8).

Summary

According to the embodiment 2, as described above, the vehicle notification after the beacon notification is further performed automatically. Accordingly, since the substitute agent can easily grasp that the substitute agent further approaches the vehicle 10 by the vehicle notification, it is possible to find the vehicle 10 more easily. The vehicle notification may be performed without the beacon notification.

The configurations in the embodiments 1, 2, the processes, the service, and the like are merely examples. A change or modification of the embodiments 1, 2 as appropriate within a scope of the gist of the disclosure is included in the disclosure. A configuration obtained by combining the configurations in the embodiments 1, 2 as appropriate or the like is also included in the disclosure. For example, when the requester picks up the vehicle parked by the substitute agent, the notifications as described above may be performed from the requester terminal to the requester. When the person returns to the vehicle after a certain person parks the vehicle, the notifications as described above may be performed to the person.

What is claimed is:

1. A non-transitory storage medium storing instructions that are executable by one or more processors of a first terminal and one or more processors of a second terminal and that cause the one or more processors of the first terminal and the one or more processors of the second terminal to execute a method comprising:
    sending, by the first terminal, a request information to a server, the request information including position information relating to a position of a vehicle, and vehicle identification information of the vehicle;
    receiving, by the second terminal from the server, a request signal that includes the position information relating to the position of the vehicle, and the vehicle identification information of the vehicle;
    displaying, on the second terminal, map information including the position information;
    receiving, from a device provided in the vehicle when the second terminal enters a first area around the vehicle, a signal that includes vehicle identification information that matches the vehicle identification information included in the request signal; and
    displaying, on the second terminal in response to reception of the signal from the device provided in the vehicle that includes the vehicle identification information, first information indicating that the vehicle is near the second terminal.

2. The non-transitory storage medium according to claim 1, wherein the map information is displayed before the second terminal enters the first area around the vehicle.

3. The non-transitory storage medium according to claim 1, wherein the method further comprises displaying on the second terminal, second information indicating a distance between the vehicle and the second terminal after displaying the first information.

4. The non-transitory storage medium according to claim 1, wherein the method further comprises:
    receiving vehicle information specifying the vehicle; and
    displaying on the second terminal the vehicle information.

5. The non-transitory storage medium according to claim 3, wherein the second information indicating the distance between the vehicle and the second terminal is updated as the terminal approaches the vehicle, and the method further comprises:
    displaying on the second terminal the updated second information.

6. The non-transitory storage medium according to claim 3, wherein the method further comprises: outputting, via a speaker of the second terminal, the second information indicating the distance between the vehicle and the second terminal after displaying the first information.

7. The non-transitory storage medium according to claim 1, wherein the second terminal is a mobile phone, a smartphone, a tablet, or a portable sized personal computer.

8. A leading system comprising:
    a device provided in a vehicle and configured to output a predetermined signal to an area around the vehicle, the predetermined signal including vehicle identification information;
    a first terminal configured to send a request information to a server, the request information including position information relating to a position of the vehicle, and the vehicle identification information that matches the vehicle identification information included in the predetermined signal; and
    a second terminal configured to:
        receive, from the server, a request signal that includes the position information relating to the position of the vehicle, and the vehicle identification information that matches the vehicle identification information included in the predetermined signal,
        receive, from the device provided in the vehicle when the second terminal enters the area around the vehicle, the predetermined signal that includes the vehicle identification information that matches the vehicle identification information included in the request signal,
        display, in response to reception of the predetermined signal that includes the vehicle identification information, first information indicating that the vehicle is near the second terminal.

9. The leading system according to claim 8, wherein the second terminal is further configured to display map information including the position information before the terminal enters the area around the vehicle.

10. The leading system according to claim 8, wherein the second terminal is further configured to display second information indicating a distance between the vehicle and the second terminal after the second terminal displays the first information.

11. The leading system according to claim 8, wherein the second terminal is further configured to:
    receive vehicle information specifying the vehicle; and
    display the vehicle information.

12. The leading system according to claim 10, wherein:
    the second information indicating the distance between the vehicle and the second terminal is updated as the second terminal approaches the vehicle; and
    the second terminal is further configured to display the updated second information.

13. The leading system according to claim 10, wherein the second terminal is further configured to:
    output, via a speaker, the second information indicating the distance between the vehicle and the second terminal after displaying the first information.

14. The leading system according to claim 8, wherein the second terminal is a mobile phone, a smartphone, a tablet, or a portable sized personal computer.

15. The leading system according to claim 8, wherein the device is a beacon provided in the vehicle.

16. The leading system according to claim 15, wherein the vehicle identification information is a beacon ID associated with the beacon provided in the vehicle.

17. A method performed in a first terminal and a second terminal, comprising:
- sending, by the first terminal, a request information to a server, the request information including position information relating to a position of a vehicle, and vehicle identification information of the vehicle;
- receiving, by the second terminal from the server, a request signal that includes the position information relating to the position of the vehicle, and the vehicle identification information of the vehicle;
- displaying, on the second terminal, map information including the position information;
- receiving, from a device provided in the vehicle when the second terminal enters a first area around the vehicle, a signal that includes vehicle identification information that matches the vehicle identification information included in the request signal; and
- displaying, on the second terminal in response to reception of the signal from the device provided in the vehicle that includes the vehicle identification information, first information indicating that the vehicle is near the second terminal.

18. The method according to claim 17, wherein the map information is displayed before the second terminal enters the first area around the vehicle.

19. The method according to claim 17, further comprising displaying on the second terminal, second information indicating a distance between the vehicle and the second terminal after displaying the first information.

20. The method according to claim 17, further comprising:
- receiving vehicle information specifying the vehicle; and
- displaying on the second terminal the vehicle information.

* * * * *